US012633471B1

(12) United States Patent
Gibson

(10) Patent No.: US 12,633,471 B1
(45) Date of Patent: May 19, 2026

(54) FLOATING PRESS PLATE FOR PUSHBUTTON SWITCH

(71) Applicant: Paul Harry Gibson, Clayton, MO (US)

(72) Inventor: Paul Harry Gibson, Clayton, MO (US)

( * ) Notice: Subject to any disclaimer, the term of this patent is extended or adjusted under 35 U.S.C. 154(b) by 0 days.

(21) Appl. No.: 19/302,198

(22) Filed: Aug. 18, 2025

Related U.S. Application Data

(60) Provisional application No. 63/688,643, filed on Aug. 29, 2024.

(51) Int. Cl.
*H01H 13/04* (2006.01)
*H01H 13/02* (2006.01)
*H01H 13/52* (2006.01)

(52) U.S. Cl.
CPC .......... *H01H 13/04* (2013.01); *H01H 13/023* (2013.01); *H01H 13/52* (2013.01)

(58) Field of Classification Search
CPC ......... H01H 2221/05; H01H 2221/058; H01H 2221/066; H01H 2221/078; H01H 2221/082; H01H 2221/09; H01H 2013/00; H01H 2013/02; H01H 2013/04; H01H 2013/06; H01H 2223/00; H01H 2223/022; H01H 2223/044; H01H 2223/056; H01H 13/00; H01H 13/04; H01H 13/02; H01H 13/023; H01H 13/52; H01H 13/12; H01H 13/14; H01H 13/20; H01H 13/50; H01H 2003/00; H01H 2003/02; H01H 2003/12; H01H 2225/026; H01H 2231/016; H01H 2231/052; H01H 2233/008; H01H 2233/03; H01H 2300/03
USPC .......................................... 200/5 A, 314, 345
See application file for complete search history.

(56) References Cited

U.S. PATENT DOCUMENTS

| | | | | |
|---|---|---|---|---|
| 5,201,824 | A | 4/1993 | Kato et al. | |
| 5,399,820 | A | 3/1995 | Silfvast | |
| 6,310,308 | B1 * | 10/2001 | Watson | H01H 13/023 200/345 |
| 6,900,404 | B2 | 5/2005 | Searle et al. | |
| 7,884,297 | B2 | 2/2011 | Okuzumi | |

(Continued)

OTHER PUBLICATIONS

Wireless Wall Switch Add-On [online], Bright Image Corporation, Aug. 24, 2023. Retrieved from the Internet: <URL: www.touchandglow.com/product-p/r-4711.htm>.

(Continued)

*Primary Examiner* — Anthony R Jimenez
(74) *Attorney, Agent, or Firm* — Carmody MacDonald P.C.; Dennis JM Donahue, III; Kevin C. Staed

(57) ABSTRACT

A pushbutton assembly includes a pushbutton switch and its housing, a cover with a frame around an aperture, and a press plate that is positioned within the aperture. The pushbutton switch has a spring-loaded post that is used to open and close the switch's circuit. The cover is connected to the housing, and the spring-loaded post's free end extends to the aperture. The press plate floats within the cover's aperture and its base engages with the spring-loaded post's free end. The free-floating press plate is not attached to either the spring-loaded post as in the case of button actuators or to the cover or any other portion of the switch assembly as in the case of the hinged press plates; instead, the press plate has laterally extending tabs that are constrained within the aperture by overhangs in opposite ends of the frame and by the spring-loaded post's free end.

20 Claims, 4 Drawing Sheets

(56) References Cited

U.S. PATENT DOCUMENTS

| | | | | |
|---|---|---|---|---|
| 8,149,591 | B2 | 4/2012 | Feldstein et al. | |
| 9,153,395 | B2 * | 10/2015 | Chu | H01H 9/181 |
| 9,853,429 | B2 | 12/2017 | Trolese et al. | |
| 10,943,749 | B2 | 3/2021 | Wisniewski | |
| D1,068,691 | S | 4/2025 | Gibson | |

OTHER PUBLICATIONS

Atlas IED WPD-SWCC—Wall Plate Push Button Switch with Hard Contact Closure [online], Full Compass Systems, Sep. 25, 2023. <URL: www.fullcompass.com/prod/245798-atlas-ied-wpd-swcc-wall-plate-push-button-switch-with-hard-contact-closure>.

Hubbell Weatherproof Wallplates [online], Grainger, Inc., Sep. 25, 2023. <URL: www.grainger.com/ec/pdf/3D012_2.pdf>.

* cited by examiner

10

FLOATING PRESS PLATE FOR PUSHBUTTON SWITCH

CROSS-REFERENCE TO RELATED APPLICATIONS

This application claims priority from U.S. Provisional Pat. App. No. 63/688,643 filed on Aug. 29, 2024, which is hereby incorporated by reference

STATEMENT REGARDING FEDERALLY SPONSORED RESEARCH

Not Applicable.

APPENDIX

Not Applicable.

BACKGROUND OF THE INVENTION

Field of the Invention

The present invention relates to electric switches, and more particularly to electric pushbutton switch assemblies.

Related Art

Pushbutton switches have been used for decades to control the state of electrical loads for a variety of different applications, including lighting elements, fans, etc. Pushbutton switches operate by pushing down on a spring-loaded post which closes the electrical circuit in one position and opens the electrical circuit in another position. Since the spring-loaded post is typically very slender, most pushbutton switches have either a larger button actuator that is attached to the distal end of the post or a press plate actuator that is cantilevered over the distal end of the post and is hingedly attached to a cover that is adjacent to the post. In either situation, the button or hinged press plate has an attachment either to the post or the cover. The size of the button is typically limited to the size of a person's fingertip which engages the button. In comparison, the hinged press plate can be much larger than the button and can be equivalent in size to flip switches and paddle switches that rotate between the open and closed positions. However, the hinged press plates prevent the operation of the switch when pressing on the press plate at the hinge's location. Additionally, due to the fulcrum effect of the hinge, a larger force is required to actuate the switch when pressing on the hinge side of the press plate as compared to the opposite side of the press plate. Accordingly, there has been a desire for a pushbutton switch that can be operated by pressing down anywhere on the press plate surface and which functions with a relatively uniform force regardless of the location where the force is applied on the press plate surface.

There have been different apparatuses devised for pushbutton switches. For example, U.S. Pat. No. 5,201,824 describes a pushbutton switch which employs a spring assembly to operate the pushbutton switch; U.S. Pat. No. 6,900,404 describes a pushbutton switch that uses a mating guide to move the pushbutton pivotally about a pivot point; U.S. Pat. No. 7,884,297 describes a pushbutton switch which operates using a see-saw apparatus; and U.S. Pat. No. 8,149,591 describes a pushbutton switch actuator with air-gap contacts that operate the switch assembly.

Even with these various pushbutton switches, there remains a desire for a secure mechanism in which the entire pushbutton surface area can be used to operate the switch assembly.

SUMMARY OF THE INVENTION

The invention described herein is a pushbutton assembly which allows control of the state of the electrical load for various applications, such as indoor lighting conditions. The pushbutton assembly includes a pushbutton switch with a spring-loaded post that is used to open and close the circuit, a housing which houses the pushbutton switch, a cover connected to the housing that includes a frame and an aperture to which the post extends, and a press plate that floats within the cover's aperture and engages with the pushbutton's spring-loaded post. The press plate of the present invention differs from the prior art because it is not attached to either the spring-loaded post as in the case of button actuators or to the cover or any other portion of the switch assembly as in the case of the hinged press plates.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings.

DETAILED DESCRIPTION OF THE PREFERRED EMBODIMENTS

The following description of the preferred embodiment(s) is merely exemplary in nature and is in no way intended to limit the invention, its application, or uses.

Figure 1:
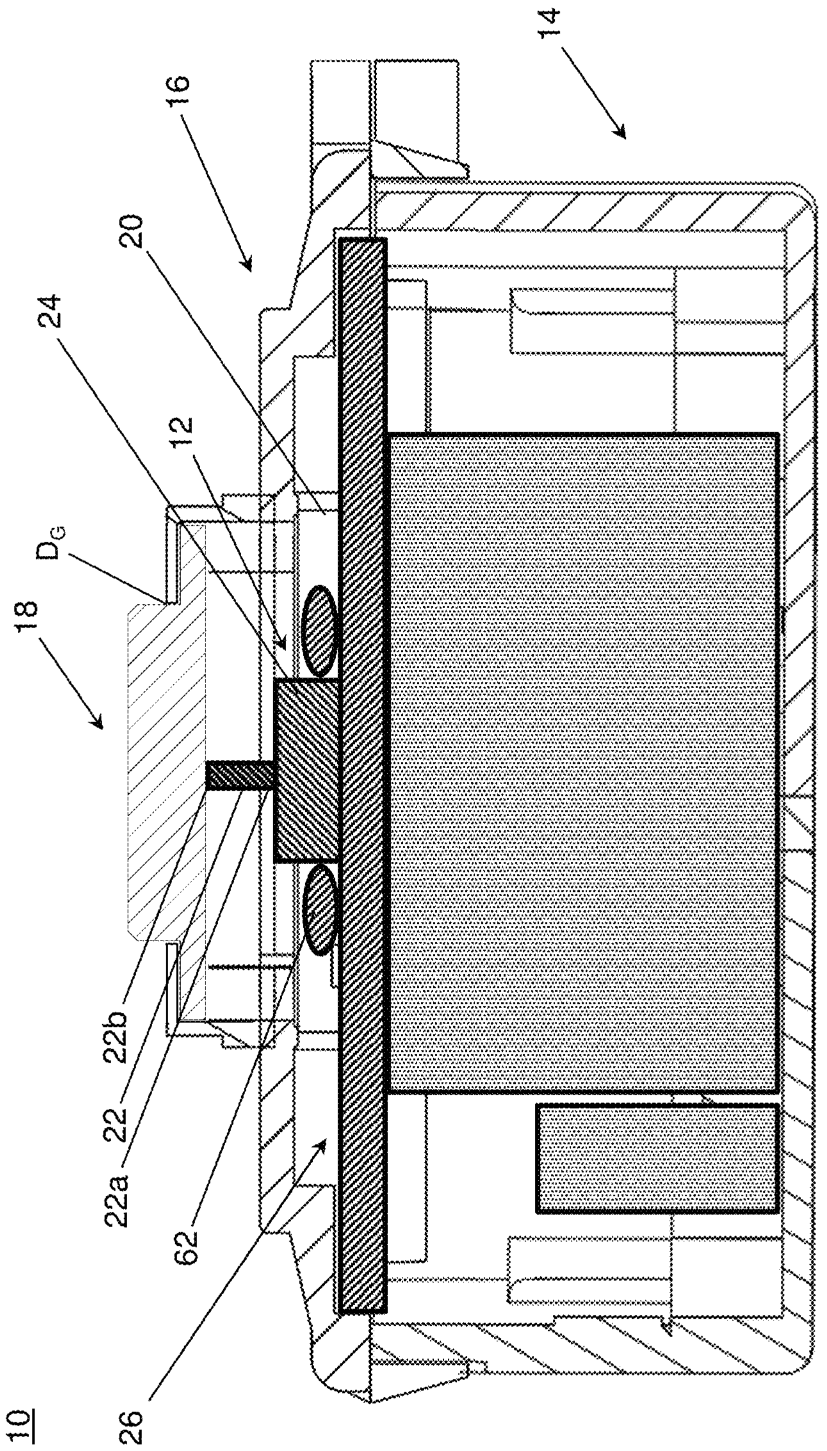
FIG. 1 is a cross-sectional view of the switch assembly according to the present invention.
Figure 2:
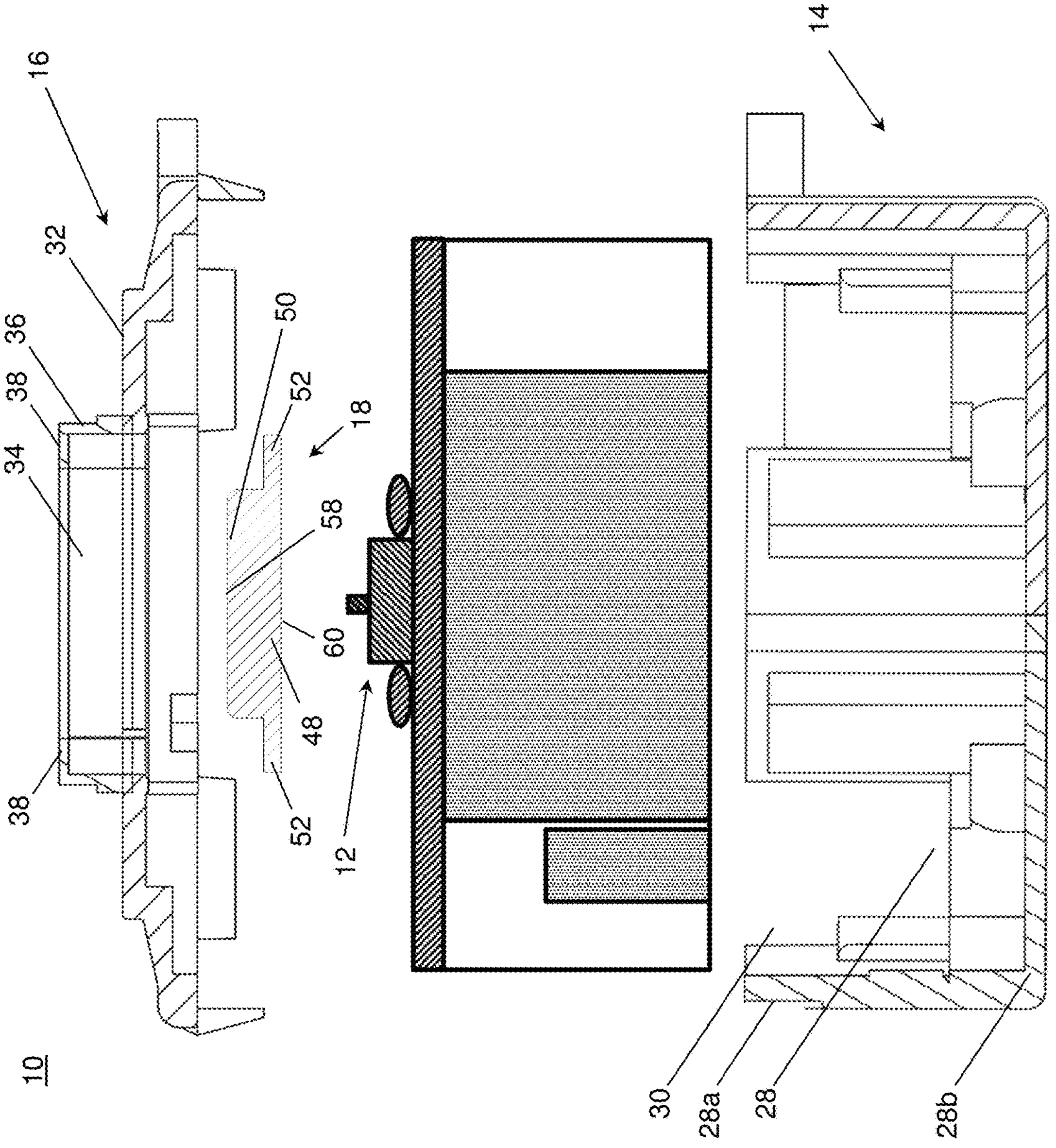
FIG. 2 is an exploded cross-sectional view of the components in the switch assembly of FIG. 1.

As shown in FIGS. 1 and 2, the switch assembly 10 includes a pushbutton switch 12, a housing 14, a cover 16, and a press plate 18. The pushbutton switch 12 is contained within an interior space 20 within the housing and the cover and has a spring-loaded post 22 that extends from its fixed end 22*a* to its free end 22*b*. The post's fixed end is contained in a mount 24 that is connected to a circuit board 26, and the post's free end has a spring-biased extended position (FIG. 1) and an inwardly forced depressed position (FIG. 2). The housing has an enclosed section 28 which surrounds the interior space and an open area 30 at a top side 28*a* of the enclosed section. The circuit board, relay, capacitors, and other electronics are contained within the enclosed section and held in place by supports that extend upward from the bottom side 28*b* of the enclosed section. The spring-loaded post protrudes outward from the enclosed section away from the interior space to its free end. Preferably, the enclosed section is a rectangular box with sidewalls that extend up from the bottom side around the interior space to the open area at the top side. The rectangular box preferably includes slots on opposite sides of the housing that receive screw terminals.

Figure 3B:
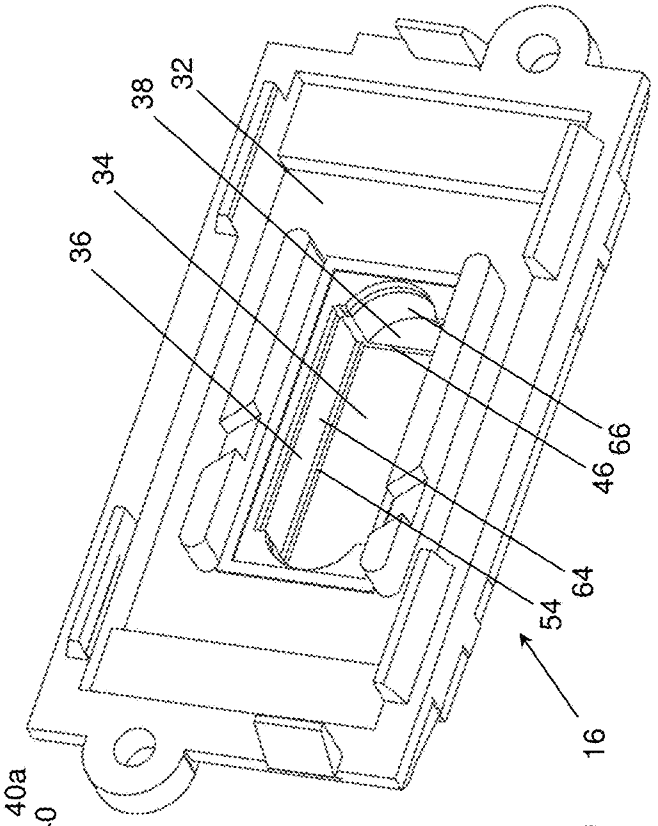
FIGS. 3A and 3B are top and bottom perspective views, respectively, of the cover for the switch assembly of FIG. 1.
Figure 3A:
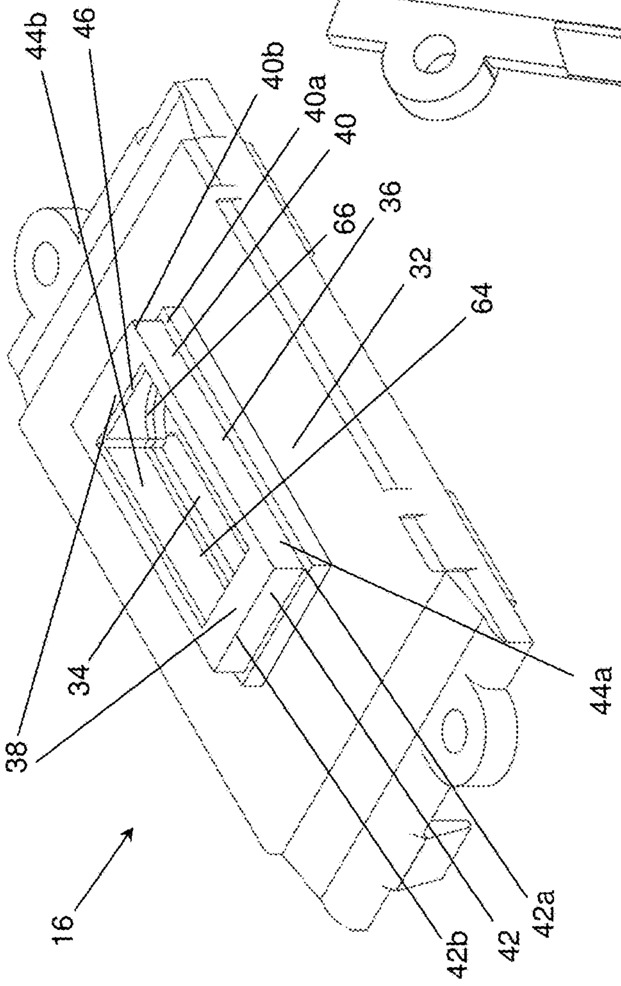

The cover 16 encloses the open area of the housing and includes a panel 32 with an aperture 34, a frame 36 that is attached to the panel and surrounds the aperture, and a pair of overhangs 38 that are attached to the frame. Preferably, the cover's panel has a slim rectangular shape with a thickness that is less than half the cover's lateral width and less than a quarter of the cover's longitudinal length. The spring-loaded post extends away from the housing's interior space with its free end extending into the aperture. As particularly shown in FIGS. 3A and 3B, the cover's frame has sidewalls 40, 42 that are attached to the cover's panel at their proximal end 40*a*, 42*a* and protrude outwardly away from the circuit board to their distal end 40*b*, 42*b*. The outer perimeter 44*a* of the frame's sidewalls is preferably rectangular, with the sidewalls being perpendicular to the plane of the panel, and the shape of the frame's inner perimeter 44*b* is formed by a pair of straight, parallel longitudinal sidewalls 64 and a pair of concave lateral sidewalls 66 connecting the parallel longitudinal sidewalls at opposite ends. The lateral sidewalls are preferably semicircular, and at the distal end of the frame, the overhangs extend laterally from the semicircular sidewalls to cover the semicircular portion of the aperture, and each of the overhangs has an edge 46 that is perpendicular to the parallel longitudinal sidewalls. Accordingly, the frame's inner perimeter defines the aperture's shape from its proximal end up to the overhangs at the distal end.

The press plate 18 is positioned within the sidewalls of the frame and includes a base section 48, a platform section 50 extending outwardly from the base section, and a pair of tabs 52 extending laterally away from the base section. The press plate has a planform shape that conforms to the aperture's geometric shape with the base section and the platform section fitting between the parallel longitudinal sidewalls and the tabs protruding out to the semicircular sidewalls. The base section of the press plate engages with the free end of the spring-loaded post such that the post forces the tabs into contact with the overhangs when the spring-loaded post's free end is in the spring-biased extended position. The press plate is not attached to the cover and translates freely in the aperture, having a small space between the press plate's sidewalls and the frame's inner sidewalls. Accordingly, the press plate is physically constrained by the free end of the spring-loaded post that engages the press plate's base and the tabs that engage the overhangs. When the free end of the spring-loaded post is in the inwardly forced depressed position, at least one of the tabs disengages from the corresponding overhang, creating an open space between the overhang and the tab.

Figure 4:
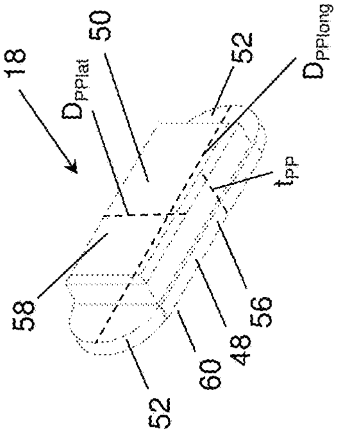
FIG. 4 is a perspective view of a press plate for the switch assembly of FIG. 1.

As particularly shown in FIG. 4, the press plate is generally oblong with its longitudinal distance ($D_{PPlong}$) between the tabs being greater than twice its lateral distance ($D_{PPlat}$) between the pair of longitudinal sides, i.e., $D_{PPlong}>2*D_{PPlat}$, and the inner perimeter of the frame has the a nearly identical relative dimension for its longitudinal and lateral sidewalls. The platform and the base section each have a rectangular shape corresponding with the parallel longitudinal sides of the aperture and the edge of the overhangs. The semicircular sidewalls at opposite ends of the parallel longitudinal sidewalls and corresponding semicircular tabs are preferred over sidewalls and tabs with perpendicular angles because sharp corners could result in binding between the sidewalls and tabs. The rounded shapes for the sidewalls and tabs help prevent binding as the press plate moves within the aperture. It will be appreciated that the semicircular sidewalls could have other rounded concave shapes, and the semicircular tabs could have other rounded convex shapes. For example, the rounded shapes could be the end of an oval or may be rectangular with rounded corners.

In addition to the constraint provided by the tabs engaging the overhangs, the parallel longitudinal sidewalls could each include a ridge 54 at the frame's distal end, and the base section of the press plate could have a ledge 56 that protrudes laterally outward from the longitudinal sides. When the spring-loaded post's free end is in the spring-biased extended position, the ledge would be pressed up against the ridge, and the top of the platform section 58 preferably extends out past the frame's distal end of the frame. As particularly shown in FIGS. 4 and 5, the top is preferably faceted or rounded to help keep the press plate centered in the aperture as the platform section is pushed into the engagement with the overhangs and the ridges.

The thickness of the press plate ($t_{PP}$) between the base section's bottom 60 to the platform section's top 58 is preferably an order of magnitude greater than the gap ($D_G$) between the press plate's sidewalls and the frame's inner sidewalls, i.e., $D_G$>>$t_{PP}$. This greater thickness relative to the space provides another physical constraint to the movement of the press plate, preventing the press plate from around its longitudinal axis within the aperture. The press plate can have a slight rotation around its lateral axis within the aperture as it translates relative to the aperture. With this slight rotation, when the press plate is depressed close to the edge of one of the overhangs, it is possible that only one of the tabs disengages from the overhang. When the press plate is depressed toward the middle, both of the tabs disengage from the corresponding overhangs.

Figure 5:
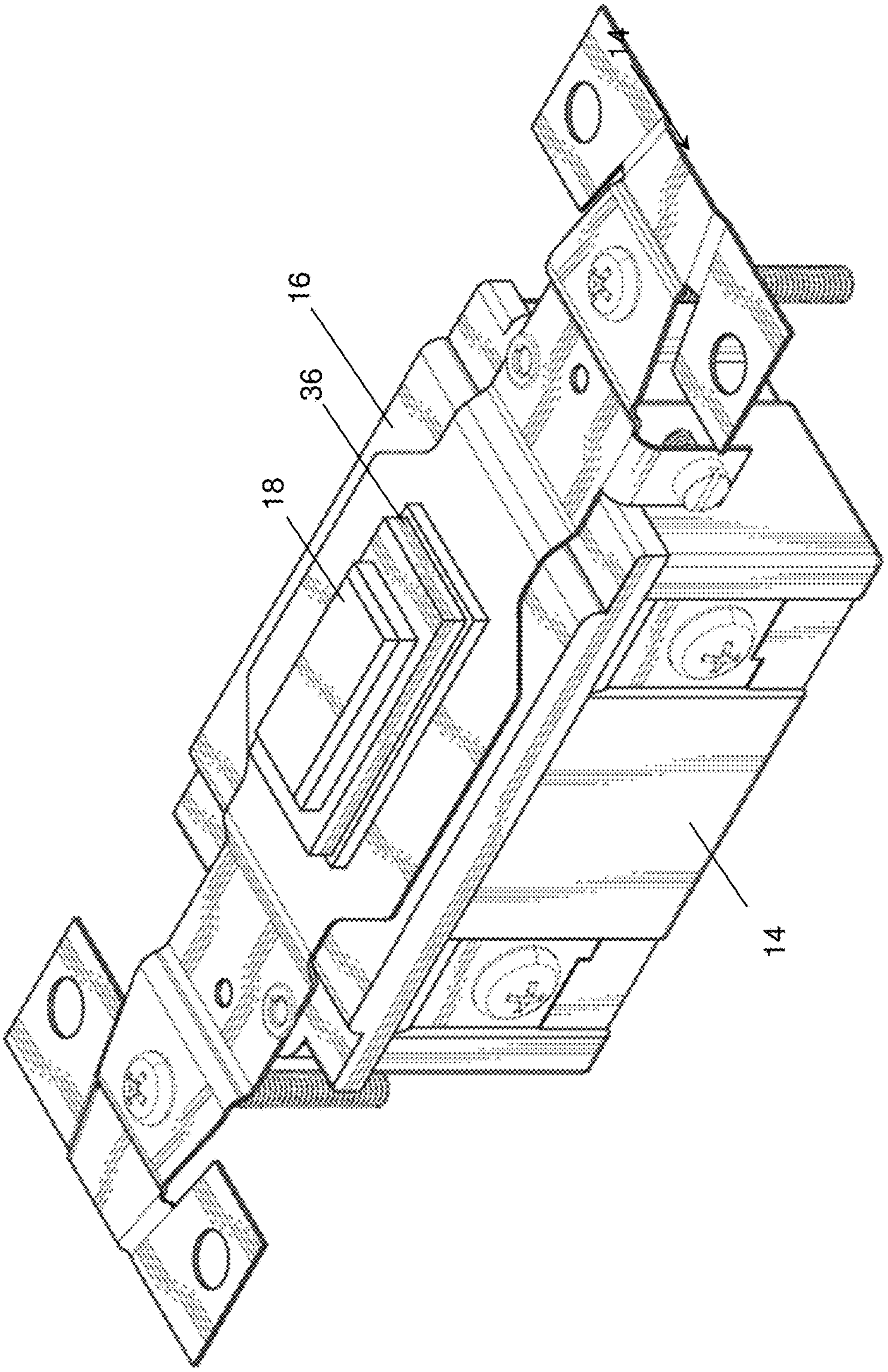
FIG. 5 is a perspective view of the switch assembly of FIG. 1.

In the preferred embodiment, the switch assembly also contains a first set of ears that protrude laterally outwards from opposite ends of the top side of the housing and a second set of ears that protrude laterally outwards from opposite ends of the cover. Each one of the ears in the first set of ears and the second set of ears has an opening. The openings of both sets of ears are aligned with each other. As shown in FIG. 5, a mounting bracket attaches to the ears.

An optional spacer can be positioned between the cover's panel and the circuit board. Alternatively, the interior side of the cover's panel can be integrally formed with one or more spacers that extend to the circuit board. The circuit board preferably includes LED lights 62 on opposite sides of the spring-loaded post, and the push plate is translucent and is illuminated by the LED lights.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A switch assembly for controlling power to electronic devices, comprising:

a pushbutton switch comprising a circuit board and a spring-loaded post, wherein the spring-loaded post extends from a fixed end connected to the circuit board to a free end, and wherein the free end has a spring-biased extended position and an inwardly forced depressed position;

a housing, wherein the housing comprises an enclosed section, an interior space surrounded by the enclosed section, and an open area at a top side of the enclosed section, wherein the circuit board is contained within the enclosed section in the interior space, and wherein the spring-loaded post protrudes outward from the enclosed section away from the interior space to the open area;

a cover connected to the housing, wherein the cover comprises a panel, a frame, an aperture in the panel surrounded by the frame, and a pair of overhangs, wherein the cover encloses the open area of the housing at the top side of the enclosed section, wherein the free end of the spring-loaded post is located in the aperture, wherein the frame is fixedly attached to the panel at a proximal end and extends outwardly away from the circuit board to a distal end and is comprised of a pair of longitudinal sidewalls and a pair of lateral sidewalls, wherein the aperture has a first geometric shape defined by an inner perimeter of the frame, and wherein the pair of overhangs are fixedly attached to the pair of lateral sidewalls at the distal end and extend laterally toward each other over a portion of the aperture; and a press plate positioned within the inner perimeter of the frame, wherein the press plate has a planform shape conforming to the first geometric shape of the aperture, wherein the press plate is comprised of a base section, a platform section extending outwardly from the base section, and a pair of tabs extending laterally away from the base section, wherein the base section of the press plate engages with the free end of the spring-loaded post, and wherein the free end of the spring-loaded post forces the tabs into contact with the overhangs when the free end is in the spring-biased extended position.

2. The switch assembly of claim 1, wherein the circuit board is further comprised of a light emitting diode (LED), wherein the LED is located in the aperture adjacent to the spring-loaded post, and wherein the press plate is translucent.

3. The switch assembly of claim 1, wherein the press plate is not attached to the cover and translates within the aperture between an elevated release position and a lowered push position, wherein the elevated position corresponds with the spring-biased extended position of the free end of the spring-loaded post, and wherein the lowered push position corresponds with the inwardly forced depressed position of the free end of the spring-loaded post.

4. The switch assembly of claim 3, wherein the free end of the spring-loaded post engages the base station when the press plate is in the elevated release position and in the lowered push position, and wherein at least one of the tabs disengages from and is spaced a distance away from one of the overhangs when the press plate is in the lowered push position.

5. The switch assembly of claim 1, wherein the first geometric shape is defined by a straight and parallel inner perimeter of the longitudinal sidewalls and a concave inner perimeter of the lateral sidewalls, and wherein the base section and the tabs of the press plate together form the first geometric shape.

6. The switch assembly of claim 5, wherein a thickness of the press plate between a bottom of the base section and a top of the platform section is an order of magnitude greater than a gap distance between the press plate and the parallel longitudinal sidewalls.

7. The switch assembly of claim 5, wherein an outer perimeter of the frame has a second geometric shape different from the first geometric shape of the aperture.

8. The switch assembly of claim 7, wherein the second geometric shape of the outer perimeter of the frame is rectangular.

9. The switch assembly of claim 5, wherein the lateral sidewalls have a semicircular shape, wherein the overhangs cover a semicircular portion of the aperture, wherein each of the overhangs has an edge perpendicular to the parallel longitudinal sidewalls, wherein the pair of tabs have a semicircular shape corresponding with the semicircular portion of the aperture, wherein the platform has a rectangular shape corresponding with the parallel longitudinal sidewalls and the edge of the overhangs, and wherein a top of the platform section extends out past the distal end of the frame when the free end is in the spring-biased extended position.

10. The switch assembly of claim 9, wherein a longitudinal distance of the press plate between the tabs is greater than twice a lateral distance of the press plate between a pair of longitudinal sides, wherein the parallel longitudinal sidewalls are further comprised of a ridge at the distal end, and wherein the base section of the press plate is further comprised of a ledge protruding laterally outward from the longitudinal sides.

11. A switch assembly for controlling power to electronic devices, comprising:

a pushbutton switch comprising a circuit board and a spring-loaded post, wherein the spring-loaded post extends from a fixed end connected to the circuit board to a free end, and wherein the free end has a spring-biased extended position and an inwardly forced depressed position;

a housing, wherein the housing comprises an enclosed section, an interior space surrounded by the enclosed section, and an open area at a top side of the enclosed section, wherein the circuit board is contained within the enclosed section in the interior space, and wherein the spring-loaded post protrudes outward from the enclosed section away from the interior space to the open area;

a cover connected to the housing, wherein the cover comprises a panel, a frame, an aperture in the panel surrounded by the frame, and a pair of overhangs, wherein the cover encloses the open area of the housing at the top side of the enclosed section, wherein the free end of the spring-loaded post is located in the aperture, wherein the frame is fixedly attached to the panel at a proximal end and extends outwardly away from the circuit board to a distal end and is comprised of a pair of longitudinal sidewalls and a pair of lateral sidewalls, wherein the aperture has a first geometric shape defined by an inner perimeter of the frame, and wherein the pair of overhangs are fixedly attached to the pair of lateral sidewalls at the distal end and extend laterally toward each other over a portion of the aperture; and a press plate positioned within the inner perimeter of the frame, wherein the press plate is comprised of a base section, a platform section extending outwardly from the base section, and a pair of tabs extending laterally away from the base section, wherein the base section and the pair of tabs form a planform shape conforming to the first geometric shape of the aperture, wherein the base section of the press plate engages with the free end of the spring-loaded post, and wherein the free end of the spring-loaded post forces the tabs into contact with the overhangs and forces a top of the platform section out past the distal end of the sidewalls when the free end is in the spring-biased extended position.

12. The switch assembly of claim 11, wherein an outer perimeter of the frame has a second geometric shape different from the first geometric shape of the aperture, and wherein the first geometric shape is defined by a straight and parallel inner perimeter of the longitudinal sidewalls and a concave inner perimeter of the lateral sidewalls.

13. The switch assembly of claim 12, wherein the lateral sidewalls have a semicircular shape, wherein the overhangs cover a semicircular portion of the aperture, wherein each of the overhangs has an edge perpendicular to the parallel longitudinal sidewalls, wherein the pair of tabs have a semicircular shape corresponding with the semicircular portion of the aperture, wherein the platform has a rectangular shape corresponding with the parallel longitudinal sidewalls and the edge of the overhangs, and wherein the second geometric shape of the outer perimeter of the frame is rectangular.

14. The switch assembly of claim 11, wherein the press plate is not attached to the cover and translates within the aperture between an elevated release position and a lowered push position, wherein the elevated position corresponds with the spring-biased extended position of the free end of the spring-loaded post, and wherein the lowered push position corresponds with the inwardly forced depressed position of the free end of the spring-loaded post.

15. The switch assembly of claim 14, wherein the free end of the spring-loaded post engages the base section when the press plate is in the elevated release position and in the lowered push position, and wherein at least one of the tabs disengages from and is spaced a distance away from one of the overhangs when the press plate is in the lowered push position.

16. A switch assembly for controlling power to electronic devices, comprising:

a pushbutton switch comprising a circuit board and a spring-loaded post, wherein the spring-loaded post extends from a fixed end connected to the circuit board to a free end, and wherein the free end has a spring-biased extended position and an inwardly forced depressed position;

a housing, wherein the housing comprises an enclosed section, an interior space surrounded by the enclosed section, and an open area at a top side of the enclosed section, wherein the circuit board is contained within the enclosed section in the interior space, and wherein the spring-loaded post protrudes outward from the enclosed section away from the interior space to the open area;

a cover connected to the housing, wherein the cover comprises a panel, a frame, an aperture in the panel surrounded by the frame, and a pair of overhangs, wherein the cover encloses the open area of the housing at the top side of the enclosed section, wherein the free end of the spring-loaded post is located in the aperture, wherein the frame is fixedly attached to the panel at a proximal end and extends outwardly away from the circuit board to a distal end and is comprised of a pair of parallel longitudinal sidewalls and a pair of concave lateral sidewalls, and wherein the pair of overhangs are fixedly attached to the pair of concave lateral sidewalls at the distal end and extend laterally toward each other over a portion of the aperture; and a press plate positioned in the aperture, wherein the press plate is comprised of a base section, a platform section extending outwardly from the base section, and a pair of tabs extending laterally away from the base section, wherein the base section and the platform section fit between the pair of parallel longitudinal sidewalls, wherein the pair of tabs are convex and extend out toward the concave lateral sidewalls, wherein the base section of the press plate engages with the free end of the spring-loaded post, and wherein the free end of the spring-loaded post forces the tabs into contact with the overhangs and a top of the platform section out past the distal end of the frame when the free end is in the spring-biased extended position.

17. The switch assembly of claim 16, wherein the concave lateral sidewalls and the convex tabs are semicircular.

18. The switch assembly of claim 17, wherein a longitudinal distance of the press plate between the convex tabs is greater than twice a lateral distance of the press plate between a pair of longitudinal sides, wherein the parallel longitudinal sidewalls are further comprised of a ridge at the distal end, and wherein the base section of the press plate is further comprised of a ledge protruding laterally outward from the longitudinal sides.

19. The switch assembly of claim 16, wherein the press plate is not attached to the cover and translates within the aperture between an elevated release position and a lowered push position, wherein the elevated position corresponds with the spring-biased extended position of the free end of the spring-loaded post, and wherein the lowered push position corresponds with the inwardly forced depressed position of the free end of the spring-loaded post.

20. The switch assembly of claim 19, wherein the free end of the spring-loaded post engages the base section when the press plate is in the elevated release position and in the lowered push position, and wherein at least one of the tabs disengages from and is spaced a distance away from one of the overhangs when the press plate is in the lowered push position.

* * * * *